United States Patent
Kranister et al.

(10) Patent No.: US 6,903,912 B2
(45) Date of Patent: Jun. 7, 2005

(54) METHOD FOR RECOGNITION AND/OR LIMITING THE SHORT-CIRCUIT STATE OF A SWITCHING CONVERTER AND SWITCHING CONVERTER

(75) Inventors: Andreas Kranister, Wilhelmsburg (AT); Harald Schweigert, Vienna (AT)

(73) Assignee: Siemens AG Osterreich, Vienna (AT)

( * ) Notice: Subject to any disclaimer, the term of this patent is extended or adjusted under 35 U.S.C. 154(b) by 241 days.

(21) Appl. No.: 10/332,596

(22) PCT Filed: Jul. 5, 2001

(86) PCT No.: PCT/AT01/00221

§ 371 (c)(1),
(2), (4) Date: Apr. 14, 2003

(87) PCT Pub. No.: WO02/07295

PCT Pub. Date: Jan. 24, 2002

(65) Prior Publication Data

US 2003/0156365 A1 Aug. 21, 2003

(30) Foreign Application Priority Data

Jul. 14, 2000 (AT) ........................................ A 1229/2000

(51) Int. Cl.[7] ................................................ H02H 9/08
(52) U.S. Cl. ..................................... 361/93.9; 323/276
(58) Field of Search ........................ 361/58, 93.1, 93.7; 323/276, 277

(56) References Cited

U.S. PATENT DOCUMENTS

| | | | | |
|---|---|---|---|---|
| 5,483,141 A | | 1/1996 | Uesugi ........................ 318/811 |
| 5,568,343 A | * | 10/1996 | Kosugi ......................... 361/36 |
| 5,621,603 A | | 4/1997 | Adamec et al. .............. 361/154 |
| 5,757,625 A | * | 5/1998 | Schoofs .................... 363/21.13 |
| 6,016,260 A | * | 1/2000 | Heeringa .................. 363/21.18 |
| 6,329,801 B1 | * | 12/2001 | Zuniga et al. ............... 323/285 |
| 6,366,068 B1 | * | 4/2002 | Morishita ................... 323/282 |
| 6,650,099 B2 | * | 11/2003 | Mitamura et al. .......... 323/282 |
| 6,788,513 B2 | * | 9/2004 | Kimura ........................ 361/97 |
| 6,842,064 B2 | * | 1/2005 | Yamamoto ................... 327/480 |

FOREIGN PATENT DOCUMENTS

| | | |
|---|---|---|
| DE | 3441403 A1 | 5/1986 |
| DE | 19711771 A1 | 10/1998 |
| DE | 19730220 A1 | 1/1999 |
| EP | 0 287 109 A2 | 10/1988 |

* cited by examiner

*Primary Examiner*—Brian Sircus
*Assistant Examiner*—Boris Benenson
(74) *Attorney, Agent, or Firm*—Sutherland Asbill & Brennan LLP

(57) ABSTRACT

The invention pertains to a method for detecting and/or limiting short-circuit or overcurrent states of a switching regulator, where the load current or a variable proportional to the load current is measured and compared with a predetermined maximum value, and where the result of this comparison is used to influence the switching pulses. In this case, the result of the comparison between the load current and the maximum value is only taken into consideration within at least one time window during at least one timing period of the switching pulses.

9 Claims, 2 Drawing Sheets

Figure 1:
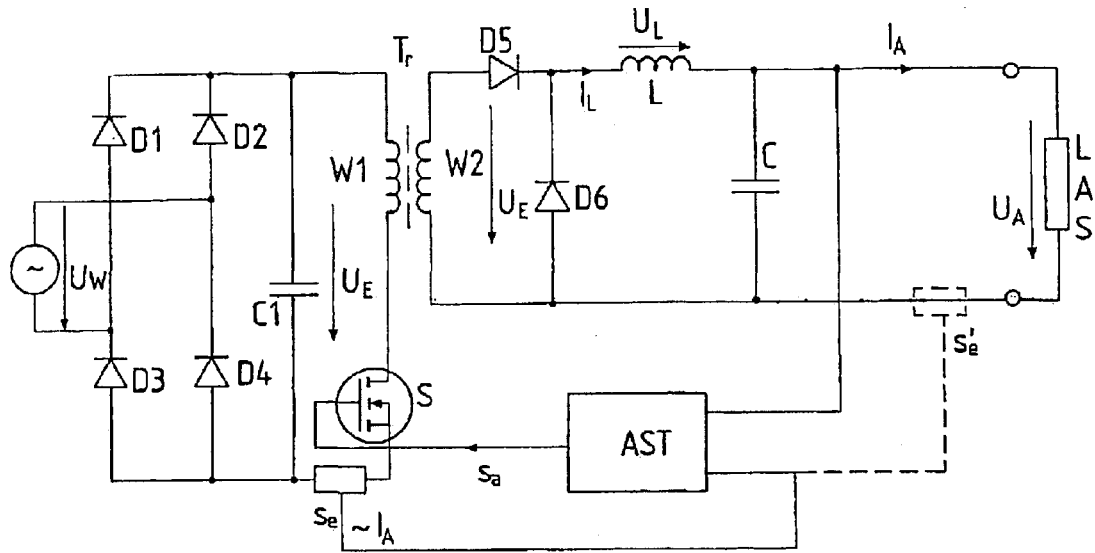

METHOD FOR RECOGNITION AND/OR LIMITING THE SHORT-CIRCUIT STATE OF A SWITCHING CONVERTER AND SWITCHING CONVERTER

CROSS-REFERENCE TO RELATED APPLICATIONS

This is a submission pursuant to 35 U.S.C. 154(d)(4) to enter the national stage under 35 U.S.C. 371 for PCT/AT01/00221, filed Jul. 5, 2001. Priority is claimed under 35 U.S.C. 119(a) and 35 U.S.C. 365(b) to Austrian Patent Application No. A 1229/2000, filed Jul. 14, 2000.

The invention pertains to a method for detecting and/or limiting short-circuit or overcurrent states of a switching regulator, where the load current or a variable that is proportional to the load current is measured and compared with a predetermined maximum value, and where the result of this comparison is used for influencing the switching pulses.

The invention also pertains to a switching regulator for converting a d.c. input voltage into an output voltage, where the input voltage can be connected to an inductor by means of at least one switch that is controlled by the switching pulses of a control circuit, and where the switching regulator is designed for influencing the switching pulses in the sense of a load current supply when a predetermined maximum value of the load current is exceeded.

Different types of switching regulators are known, e.g., forward converters and flyback converters. Although the inductor that is triggered by a controlled switch may be electrically connected to the output side, it is common practice to use transformers, where the current through a primary winding is timed by a controlled switch. The trigger circuit contains, for example, a pulse-width modulator, the pulse-width repetition rate of which can usually be varied for control purposes, for example, such that a constant output voltage is achieved.

One problem with switching regulators is short-circuits or similar overcurrent states on the output side. The load current or another electric variable that is proportional to the load current can be measured with the aid of sensors and also used for realizing the control by means of the trigger circuit. In case of a short-circuit, the pulse-width repetition rate of the switching pulses must be adjusted to be extremely low in order to achieve a stable state with only a slight increase in the output current, e.g., identical voltage-time integrals when magnetizing and demagnetizing a secondary reactor of a forward converter. Otherwise, certain components, e.g., rectifier diodes, freewheeling diodes, etc., are subjected to thermal overloads and destroyed, wherein certain safety problems may also arise. In addition, when realizing a control method such that a constant output voltage is achieved, the controller attempts to adjust a full pulse-width repetition rate in case of a short-circuit, i.e., when the output voltage almost drops to zero, in order to maintain the output voltage.

In one known solution for solving short-circuit problems, a secondary current control is carried out with a shunt that serves as a current sensor. However, this requires expensive operational amplifiers with low offset voltage, where an expensive current converter is used for high currents due to the losses on the shunt. In addition, another optocoupler is required for realizing a reliable electrical isolation between the primary and secondary circuits. This results in additional cost, especially when high input voltages occur.

Naturally, it is impossible to dimension the components in such a way that they are not destroyed—until a conventional fuse is triggered—but this solution can be rarely realized for cost reasons.

In another known solution, the current consumption of the trigger circuit is kept relatively high, with the trigger circuit being supplied from an auxiliary winding of the transformer. In case of a short-circuit, the current supply of the trigger circuit is cut off and the switching pulses are suspended until the circuit slowly restarts. However, this causes problems in the supply of the circuit in no-load operation since only an average value of the load current is limited and not its instantaneous value. A parallel connection of several switching regulators results in the same problems.

It was also determined that, in particular, in high-noise environments with strong HF-fields and/or high currents, a short-circuit state is erroneously detected due to this noise such that the switching regulator is switched off. Naturally, this is undesirable because the devices and components supplied by the switching regulator are also switched off.

The invention is based on the objective of developing a switching regulator in which short-circuit states can be rapidly and reliably detected.

In a method of the initially described type, this objective, according to the invention, is achieved in that the result of the comparison between the load current and the maximum value is only taken into consideration within at least one time window during at least one timing period of the switching pulses.

Due to the incorporation of a time window, error detection can take place during time intervals in which noise occurs less frequently, where high flexibility is ensured due to the selection of the length and position of the time window.

Here, it is practical if the time window lies within the on-time of the switching pulses during at least one timing period. This largely prevents the influence of noise during the currentless portion of each timing period.

An additional reduction of interfering influences can be achieved if the time window is chosen to be shorter than the on-time and set at the beginning of the on-time.

The reliability in detecting short-circuits can be significantly improved if the results of the comparison are integrated over several timing periods, the obtained integration value is compared with a predetermined threshold value, and the switching pulses are only affected if this threshold value is exceeded.

The load current can be simply lowered in case of a short-circuit if the switching pulses are affected so that they are suppressed over a predetermined number of timing periods.

The objective of the invention is also attained with the switching regulator of the previously described type. In order to only evaluate the load current within at least one time window during at least one timing period of the switching pulses, this switching regulator contains at least a first timing element in order to define this time window.

Here, the first timing element may be triggered at the beginning of the on-time of the switching pulses, wherein a time window is defined which is less than or equal to the on-time.

One practical variant is characterized by the fact that a first comparator is provided for comparing the load current with a first predetermined maximum value within the first time window during each timing period, by the fact that pulses obtained from this comparison are input to an integrator, by the fact that the integrator is connected in series with a second comparator for comparing the integration value with a second predetermined threshold value, and by the fact that the result of this comparison is used to influence the switching pulses.

It is also advantageous if a third timing element is provided for resetting the integrator after a predetermined number of timing periods. This prevents a faulty triggering in case short-circuit events are only detected sporadically.

According to an additional practical refinement, a fourth timing element is provided which defines a number of timing periods, during which switching pulses are suppressed in the case of a short-circuit or overcurrent event.

Figure 2:
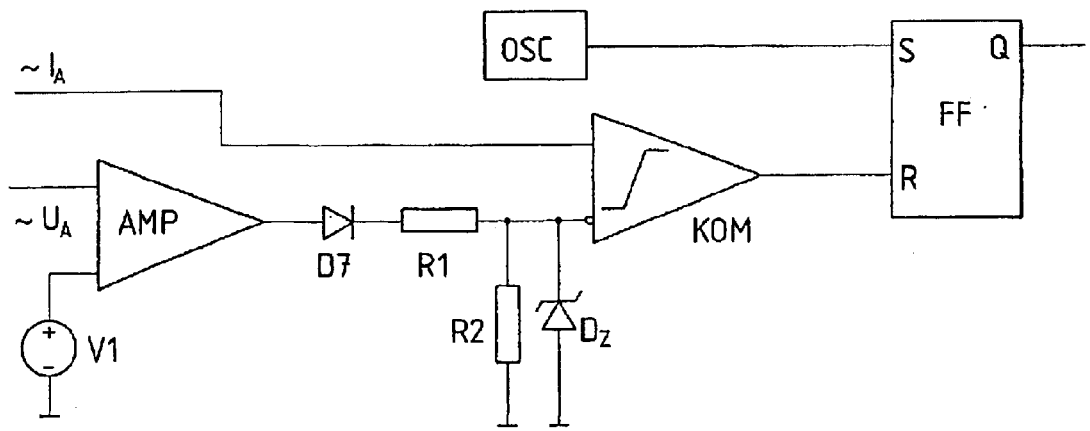
Figure 3:
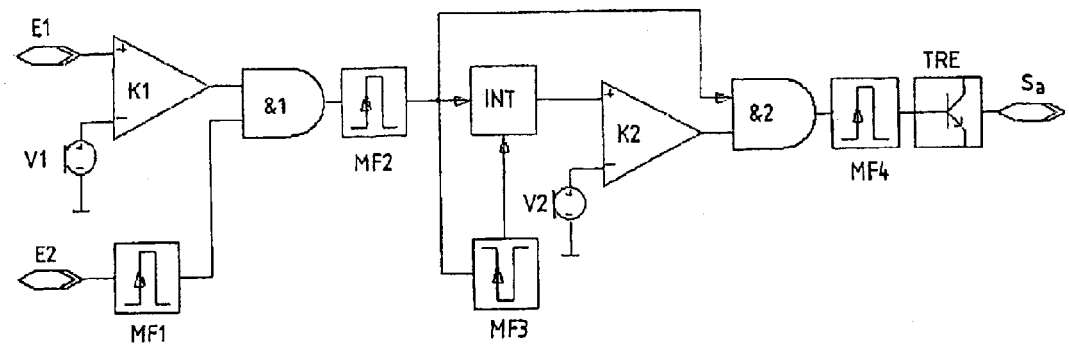
Figure 4:
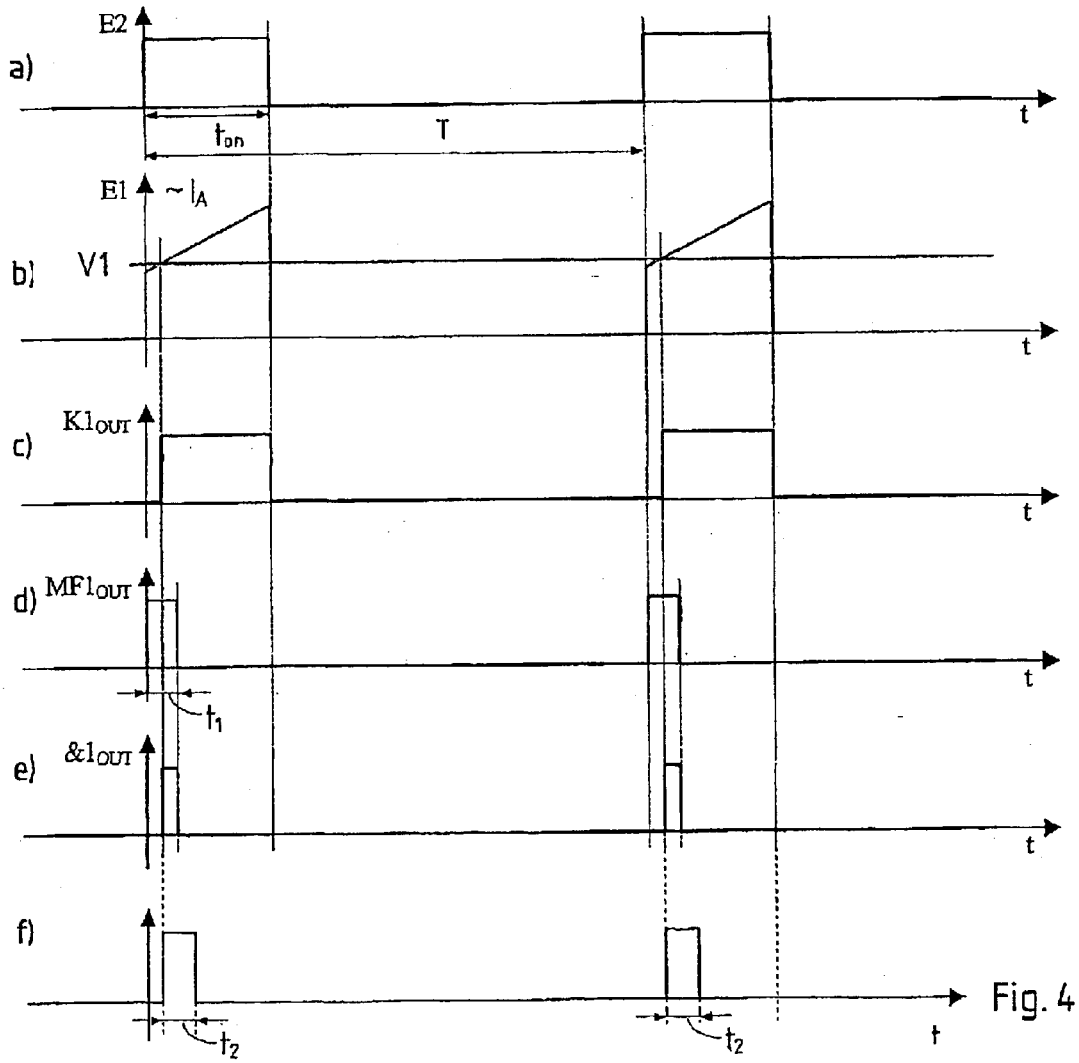

The invention, as well as other advantages thereof, are explained in greater detail below with reference to embodiment examples that are illustrated in the figures. The figures show:

FIG. 1, a basic circuit diagram of a switching regulator according to the prior art;

FIG. 2, part of a trigger circuit according to the prior art;

FIG. 3, part of a trigger circuit of the switching regulator according to the invention, and FIG. 4, a diagram for explaining the method according to the invention.

FIG. 1 shows a switching regulator that is realized in the form of a forward converter and the input voltage $U_E$ of which is obtained from an a.c. voltage $U_W$, e.g., a power supply, by means of rectification with the aid of a rectifier D1, D2, D3, D4 and smoothing by means of a capacitor C1. The d.c. input voltage $U_E$ can be applied to the primary winding W1 of a transformer Tr via a controlled switch S, in this case, a field-effect transistor. On the secondary side, the voltage of the secondary winding W2 is rectified by means of a diode D5 and fed to an output capacitor C2 via a choke L. In addition, a freewheeling diode D6 is conventionally provided. A load LAS to be supplied is connected to the output voltage $U_A$.

The switch S is triggered by a trigger circuit AST that delivers a square pulse with a certain pulse-width repetition rate during steady-state operation. The control is realized by supplying the output voltage $U_A$—or a fraction thereof—to the trigger circuit, wherein a current sensor Se, e.g., a shunt, delivers a signal that is proportional to the load current $I_A$ to the trigger circuit. It is thus possible to realize conventional control such that a constant output voltage or a constant load current is achieved. The current sensor Se may be realized, e.g., on the primary side of the transformer Tr, as shown, or in the form of an additional secondary current sensor Se' in the secondary circuit.

FIG. 2 shows, in greater detail, a conventional pulse-width modulator for generating the trigger pulses. An oscillator OSC outputs—in here—a fixed-frequency signal to the set-input of a flip-flop FF. An error amplifier A[mp] receives the actual value of the output voltage and a reference voltage V1, where the output of the amplifier AMP is connected to the inverting input of a comparator KOM via a diode D7 and a resistor R1, and where the other input of said comparator receives a signal that is proportional to the load current $I_A$. The inverting input is connected to ground via a resistor R2 and a Zener diode DZ connected in parallel. The output of the comparator KOM is connected to the reset-input of the flip-flop FF. Since the expert is familiar with other pertinent details, e.g., components that influence the frequency response or even negative feedback loops, etc., said details are not illustrated in the figures.

The oscillator OSC that defines the switching frequency switches on the trigger pulse at the reset-input of the flip-flop FF, where the trigger pulse is switched off either at the trailing edge of the oscillator signal or at the intersection of the control signal of the output voltage $U_A$ with the actual value of the load current $I_A$. Here, it is also possible to suppress entirely several timing periods if the control input is set to zero. This is the case, for example, at an excessively high output voltage $U_A$ or at an excessively high load current $I_A$, where the threshold is defined by the Zener diode $D_Z$.

FIG. 3 shows a first comparator K1 for comparing a voltage E1 that is proportional to the load current $I_A$ with a reference or maximum value V1 that defines the maximum load current. The output of the comparator K1 is connected to a first input of an AND-gate &1, the second input of which receives the output voltage E2 of a pulse-width modulator, e.g., according to FIG. 2, therefore the switching timing signal, via a first timing element MF1.

The output of the AND-gate &1 is connected to an integrator INT, where the output of said integrator is connected to the (noninverting) input of a second comparator K2, to the second (inverting) input of which a predetermined reference voltage V2 is applied, and where the predetermined reference voltage corresponds to a threshold value, to which the integration results are compared. A third timing element MF3 is provided for resetting the integrator K2 [sic; INT] after a predetermined number n of timing periods T, where the input of the third timing element is connected to the output of the second timing element MF2, the output of which is connected to the reset-input of the integrator INT.

The two inputs of a second AND-gate &2 respectively receive the timing period at the output of the second timing element and the output of the second comparator K2, where the output of the AND-gate &2 is connected to the input of a driving stage TRE for delivering the trigger signal Sa (see FIG. 1) for the switch S via a fourth timing element MF4.

The sequence of the method according to the invention is discussed below with reference to FIG. 4. The top diagram a) shows the profile of E2, i.e., the output pulse of the pulse-width modulator, e.g., according to FIG. 2. The pulse period is t, and the on-time is $t_{ON}$. The amplitude of the reference voltage V1, to which the voltage E1 that corresponds to the load current $I_A$ is compared, is plotted in the next diagram b). When the level V1 is exceeded, the output of the comparator K1 switches to "high" as shown in the third diagram c) of FIG. 4. The output of the comparator K1 jumps back to zero or "low" at the end of the on-time $t_{ON}$.

The signal E2 starts a nonretriggerable monostable multivibrator—the timing element MF1—and delivers a "high" signal for, e.g., the programmable monostable multivibrator time t1 as shown in diagram d) of FIG. 4. The time t1 defines a time window for the short-circuit check which lies within the on-time $t_{ON}$, at the beginning of the on-time. This ensures that noise which does not occur during the on-time $t_{ON}$ cannot be misinterpreted as a short-circuit state; overcurrent can thus only occur during the on-time $t_{ON}$. Locating the time window t1 at the beginning of the on-time has the effect of limiting the engagement options of the comparator K1 to a brief interval at the beginning of the timing pulse such that improved noise protection is achieved and dynamic saturation phenomena in the power transformer are not misinterpreted as short-circuits if changes in the load or input voltage occur. In addition, the influence of the amplitude of the input voltage on the short-circuit current is minimized in this way.

The outputs of the comparator K1 and the monostable multivibrator MF1 are linked in the first AND-gate &1, with the result of this linkage being illustrated in diagram e) of FIG. 4. In order to increase noise protection, pulses should be integrated over a certain time or number of cycles as shown in FIG. 4. However, since the duration of the pulses is not constant in diagram e), they are set to a uniform length or duration t2 in a second monostable multivibrator MF2 as shown in diagram f) of FIG. 4.

If a number of pulses according to diagram f) occur which indicate that the reference voltage V1 at the comparator K1 has been exceeded several times, these pulses are integrated in the integrator INT until they reach the predetermined reference value V2. Once this level is reached, the AND-gate &2 switches the cycle forward. This means that only the integration of many short-circuit detections will allow the circuit to become effective. The integrator INT is reset to zero retriggerable by the monostable multivibrator MF3, where the circuit arrangement is chosen such that the integrator INT is reset as soon as no short-circuit is detected during the freely programmable monostable multivibrator time t3.

The output pulses of the AND-gate &2 trigger the monostable multivibrator or timing element MF4, where the corresponding time t4 defines a number of timing periods, during which switching pulses are suppressed in the case of a short-circuit or overcurrent event. Thus, the trigger pulses, i.e., the trigger signal $S_a$ for the controlled switch S, are set to zero during time t4.

The invention makes it possible to eliminate secondary shunts that cause high losses or an expensive secondary current converter since manipulations are carried out on the primary side. The cost of the logic gates and monostable multivibrators used for this purpose is low due to the use of standard CMOS-ICs, where these components also consume little current. The use of time windows and integration significantly increase noise protection. The integration constant of the integrator INT may also be chosen in such a way that, in the case of a short-circuit, a high current flows for a certain time period which can be used for triggering automatic protection devices, etc. The input voltage has little affect on the intensity of the short-circuit current, and the short-circuit current is also limited by a zero short-circuit impedance. A generally unstable, direct manipulation of the switching frequency of the switching controller is not required in this case, and the voltage-current characteristic of the switching regulator is only altered in extreme overload and short-circuit instances.

The variant shown in FIG. 3 proved particularly advantageous, but the circuit could also be simplified depending on the given requirements. For example, the integrator INT with the series-connected comparator K2 could be eliminated. In principle, it would also be possible to eliminate the timing element MF2 whether or not an integrator is provided. The AND-gate &2 is also eliminated if no integrator INT is provided.

What is claimed is:

1. A method for detecting and/or limiting short-circuit or overcurrent states of a switching regulator comprising:

measuring the load current or a variable proportional to the load current;

comparing the load current or the variable with a predetermined maximum value; and using the result of the comparison to influence the switching pulses, wherein the result of the comparison between the load current and the maximum value is only taken into consideration within a time window during several timing periods of the switching pulses, wherein each time window is chosen to be shorter than the on-time and lies within the on-time of the switching pulses.

2. The method of claim 1, wherein the time window is set at the beginning of the on-time.

3. The method of claim 1, wherein the comparison results during several timing periods are integrated, wherein the obtained integration value is compared with a predetermined threshold value, and wherein the switching pulses are only influenced if this threshold value is exceeded.

4. The method of claim 1, wherein the switching pulses are influenced in such a way that they are suppressed over a predetermined number of timing periods.

5. A switching regulator for converting a d.c. input voltage into an output voltage, wherein the input voltage can be connected to an inductor by means of at least one switch that is controlled by the switching pulses of a trigger circuit, and wherein the switching regulator is designed to influence the switching pulses in the sense of a load current supply when a predetermined maximum value of the load current is exceeded, and wherein at least a first timing element is provided in order to evaluate the load current only within a time window that lies within the on-time of the switching pulses during several timing periods of the switching pulses, in order to define this time window.

6. The switching regulator of claim 5, wherein the first timing element is triggered at the beginning of the on-time of the switching pulses and defines a time window that is less than or equal to the on-time.

7. The switching regulator of claim 5, wherein a first comparator is provided for comparing the load current with a first predetermined maximum value within the first time window during each timing period, wherein the pulses obtained from this comparison are fed to an integrator, wherein the integrator is connected in series with a second comparator for comparing the integration value with a predetermined threshold value, and wherein the result of this comparison is used to influence the switching pulses.

8. The switching regulator of claim 7, wherein a third timing element is provided for resetting the integrator after a predetermined number of timing periods.

9. The switching regulator of claim 8, wherein a fourth timing element is provided which defines a number of timing periods, during which switching pulses are suppressed in case of a short-circuit or overcurrent event.

* * * * *